US011865599B2

United States Patent
Bartz et al.

(10) Patent No.: US 11,865,599 B2
(45) Date of Patent: Jan. 9, 2024

(54) METHOD FOR ADJUSTING AN INLET GUIDE OF A PEELING MACHINE AND PEELING MACHINE

(71) Applicant: SMS group GmbH, Duesseldorf (DE)

(72) Inventors: Alfred Bartz, Moenchengladbach (DE); Joerg Lindbuechl, Moenchengladbach (DE)

(73) Assignee: SMS Group GmbH, Duesseldorf (DE)

( * ) Notice: Subject to any disclaimer, the term of this patent is extended or adjusted under 35 U.S.C. 154(b) by 207 days.

(21) Appl. No.: 17/427,198

(22) PCT Filed: Dec. 16, 2019

(86) PCT No.: PCT/DE2019/101090
§ 371 (c)(1),
(2) Date: Jul. 30, 2021

(87) PCT Pub. No.: WO2020/156604
PCT Pub. Date: Aug. 6, 2020

(65) Prior Publication Data
US 2022/0143663 A1     May 12, 2022

(30) Foreign Application Priority Data

Jan. 31, 2019 (DE) .................. 10 2019 102 523.0
Sep. 19, 2019 (DE) .................. 10 2019 125 248.2

(51) Int. Cl.
*B21B 45/04* (2006.01)
*B23Q 17/00* (2006.01)
(Continued)

(52) U.S. Cl.
CPC .................... *B21B 45/04* (2013.01)

(58) Field of Classification Search
CPC ......... B21B 45/04; B21B 37/58; B21B 37/38; B21B 37/08; B23B 5/12; B23Q 17/005; B23Q 17/225; B23D 79/12
(Continued)

(56) References Cited

U.S. PATENT DOCUMENTS 4,005,624 A * 2/1977 Goeke ...................... B23B 5/12
                                                    483/902
5,303,621 A * 4/1994 Horlitz ...................... B23B 5/12
                                                    226/176
(Continued)

FOREIGN PATENT DOCUMENTS

DE    11 67 154 B    4/1964
DE    32 23 232 A1    12/1983
(Continued)

OTHER PUBLICATIONS

English translate (DE4122948A1), retrieved date Apr. 15, 2023.*
International Search Report in PCT/DE2019/101090, dated May 7, 2020.

*Primary Examiner* — Matthew Katcoff
*Assistant Examiner* — Mohammed S. Alawadi
(74) *Attorney, Agent, or Firm* — Collard & Roe, P.C.

(57) ABSTRACT

A method for adjusting an inlet guide of a peeling machine controls a peeling material using the inlet guide in relation to a peeling head carrying peeling tools in such a way that the volume per unit length of the peeling material, which volume is to be machined by the peeling machine, is minimized while producing a bright steel having excellent surface quality. Furthermore, a peeling machine provides appropriate measuring equipment in order to be able to carry out the method described above.

4 Claims, 4 Drawing Sheets

Figure 1:
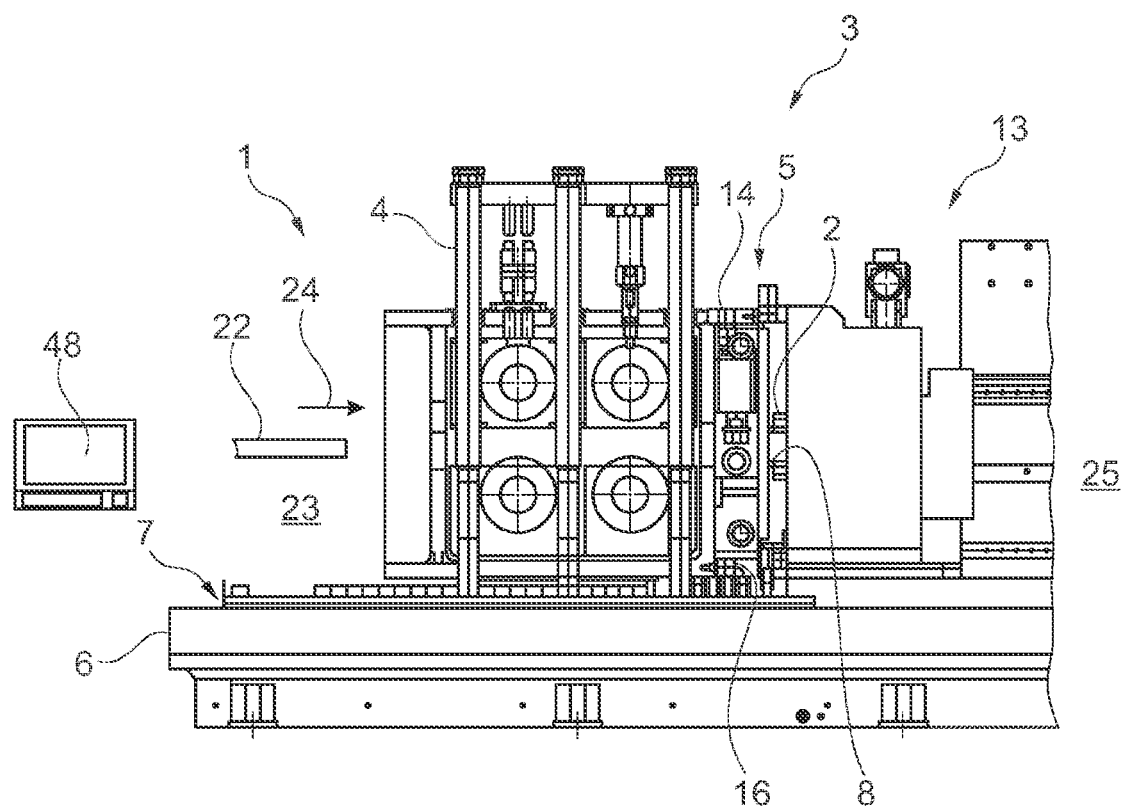

(51) Int. Cl.
*B23B 5/12* (2006.01)
*B23Q 1/76* (2006.01)
*B23Q 17/22* (2006.01)

(58) Field of Classification Search
USPC .............................................................. 72/40
See application file for complete search history.

(56) References Cited

U.S. PATENT DOCUMENTS

2006/0266172 A1    11/2006  Greuel et al.
2010/0162861 A1 *  7/2010  Bartz ........................ B23B 5/12
                                                                                     82/131

FOREIGN PATENT DOCUMENTS

| DE | 41 22 948 A1 | | 1/1993 | |
| --- | --- | --- | --- | --- |
| DE | 4122948 A1 | * | 1/1993 | .............. B23B 5/12 |
| DE | 44 16 773 A1 | | 11/1995 | |
| DE | 195 03 772 A1 | | 8/1996 | |
| DE | 101 29 207 A1 | | 5/2002 | |
| EP | 2 420 350 A2 | | 2/2012 | |
| WO | 98/02789 A1 | | 1/1998 | |

* cited by examiner

METHOD FOR ADJUSTING AN INLET GUIDE OF A PEELING MACHINE AND PEELING MACHINE

CROSS REFERENCE TO RELATED APPLICATIONS

This application is the National Stage of PCT/DE2019/101090 filed on Dec. 16, 2019, which claims priority under 35 U.S.C. § 119 of German Application Nos. 10 2019 102 523.0 filed on Jan. 31, 2019 and 10 2019 125 248.2 filed on Sep. 19, 2019, the disclosures of which are incorporated by reference. The international application under PCT article 21(2) was not published in English.

The invention relates to a method for adjusting an inlet guide of a peeling machine, in which method a material to be peeled is guided by means of the inlet guide, with reference to a peeling head that carries peeling tools. Also, the invention relates to a peeling machine comprising an entry region having an inlet guide, a peeling head that carries peeling tools, and an exit region, wherein the inlet guide carries at least two guide rollers by means of at least one roller carrier, in each instance, wherein at least one of the roller carriers can be adjusted by way of at least one guide roller setting element.

Known peeling machines have a peeling head that rotates about an axis of rotation or about a machining axis, which head has an adjusting device for tool holders that rotate with the peeling head. These tool holders, with the tools arranged on them, are set relative to a workpiece by means of the adjusting device, in such a manner that the tools remove a scale layer from a hot-rolled material, for example, so that after machining of the round material, a metallically shiny round material is present as a result.

Such a peeling machine is described, for example, in DE 101 29 207 A1, in which an adjusting device that can be displaced relative to a hollow shaft is arranged in the region of a peeling head. As a function of the displacement of the adjusting device, tool holders and the tools arranged on them are moved radially relative to a machining axis. As a result, the tools can be individually adjusted to a diameter of a basic material to be machined.

Furthermore, a machine for peeling pipes and rods is known from DE 195 03 772 A1. In this regard, peeling takes place by means of multiple peeling tools that rotate around a material to be peeled, which tools are arranged on rod-shaped tool carriers, in each instance. The tool carriers are mounted so as to be radially displaceable relative to a longitudinal axis of the material to be peeled, and support themselves against the inside of a conical bushing, among other things.

In EP 2 420 350 A2, a peeling machine having an advancing apparatus is described, wherein the advancing apparatus is equipped with push-in rollers for acceleration of workpieces, in particular of rods, pipes, bars, wires, cables or the like, wherein the push-in rollers are each driven by means of a push-in roller shaft, and wherein at least one push-in roller shaft is mounted eccentrically in a shaft holder.

Peeling machines are also disclosed in DE 41 22 948 A1 and DE 32 23 232 A1.

Materials to be peeled are predominantly forged metallic semi-finished products, which have been shaped by means of pressure-forming, and which have an expanse direction that essentially runs in a longitudinal direction. It is due to this forming method that materials to be peeled have comparatively rough tolerances. In particular, surface tolerances and straightness of the material to be peeled are affected by this.

Deviations in the straightness of the material to be peeled lead to the result that a theoretical center of the material to be peeled, in the longitudinal direction of the material to be peeled, has a curvature.

In contrast, deviations in the surface tolerance of the material to be peeled lead to deviating distances between the theoretical center of the material to be peeled and the surface of the material to be peeled.

Since these two deviations ultimately occur in very different manifestations, significant variations in the material distribution of the material to be peeled can occur along the direction of the longitudinal expanse.

A peeling machine is used to prepare a shiny product or shiny material from the material to be peeled, in particular a shiny steel or a similar semi-finished product, which is characterized by low surface shape tolerances and excellent surface quality in comparison with the material to be peeled. For this purpose, it is essential that if at all possible, the entire surface of the material to be peeled is completely machined by the peeling machine by means of removal of a chip.

It is dependent on the dimensional accuracy of the material to be peeled how much volume per length unit of the material to be peeled must be removed by the peeling machine. If the material to be peeled has comparatively great deviations with regard to its straightness and/or its surface tolerances, a comparatively great volume per length unit of the material to be peeled must be removed by the peeling machine.

Peeling machines known in the state of the art have an advancing device in the region of their peeling head, which device comprises an advancing apparatus and an inlet guide. While the advancing apparatus is set up for accelerating a material to be peeled in its longitudinal expanse direction, the inlet guide is set up for guiding the material to be peeled with reference to the peeling head. In many cases, such advancing apparatuses can be adjusted with regard to a desired advancing speed of the material to be peeled as well as with regard to a guide direction in which the material to be peeled leaves the inlet guide.

In this way, it can be brought about by means of manual intervention in the process parameters of the peeling machine that the material to be peeled runs centrally toward the peeling head and that sufficient time is made available to the peeling machine so that it can remove the volume of the material to be peeled that is to be chipped away within the machining limits of the peeling machine.

In particular if the volume of the material to be peeled that is to be peeled off, i.e. chipped away is supposed to be minimized, or if the shape tolerances of the material to be peeled have constantly varying deviations, an increased effort for adjusting the process parameters of the peeling machine disadvantageously occurs. This results in an increased burden on the technical worker monitoring the peeling machine.

It is the task of the present invention to make available a method for adjusting an inlet guide of a peeling machine and a peeling machine, which method allows the highest possible quality of the peeled material to be peeled in spite of possible imprecisions of the material to be peeled that is fed in, such as, for example, lack of roundness in its cross-section or deviations over its length.

The task of the invention is accomplished by means of methods for adjusting an inlet guide of a peeling machine and peeling machines having the characteristics of the independent claims. Further advantageous embodiments, possibly also independent of this, can be found in the dependent claims as well as in the following description.

According to a first aspect, the highest possible quality of the peeled material to be peeled can be made possible, in spite of possible imprecisions of the material to be peeled that is fed in, by means of a method for adjusting an inlet guide of a peeling machine, in which method a material to be peeled is guided with reference to a peeling head that carries peeling tools, by means of the inlet guide, if the inlet guide is regulated in such a manner, in terms of its effect on the material to be peeled, that the theoretical center of the material to be peeled remains as constant as possible with reference to the peeling head and/or with reference to the inlet guide, over the length of the material to be peeled.

Cumulatively or alternatively to this, according to a second aspect, the highest possible quality of the peeled material to be peeled can be made possible, in spite of possible imprecisions of the material to be peeled that is fed in, by means of a method for adjusting an inlet guide of a peeling machine, in which method a material to be peeled is guided with reference to a peeling head that carries peeling tools, if possible deviations of the material to be peeled from its reference guide position are measured and utilized to regulate the inlet guide.

In the present case, a "material to be peeled" is understood to be a semi-finished product composed of metal, which has an expanse direction that extends essentially in the longitudinal direction, and is supposed to be subjected or is subjected to a peeling process. A material to be peeled has predominantly been shaped using a pressure-forming method, in particular a forging method, and as a result therefore has comparatively broad tolerance field widths with regard to surface tolerances and with regard to the straightness of the longitudinal expanse axis. Furthermore, a metallic material to be peeled has a scale layer on the surface in many cases, in particular if it was shaped using a hot-forming method. Also, the latter in itself can already be a reason for subjecting a corresponding material to a peeling process as a material to be peeled.

Particularly frequent materials to be peeled are rods, pipes, bars, wires or cables, but, in particular, also blocks, hollow blocks and similar semi-finished products, which are still to be worked after peeling, for example cut up into slices.

If one determines the theoretical center of the material to be peeled as a function of the longitudinal expanse direction, then a connecting line of the theoretical center points is a crooked line for the majority of materials to be peeled.

The cross-sectional shape of a material to be peeled is generally round or approximates a round cross-sectional shape.

In the present case, a "peeling machine" is understood to be a cutting machine that gives the material to be peeled a certain geometric shape, in that excess material is mechanically removed from the material to be peeled in the form of chips. It is the goal of a peeling machine to prepare a shiny material, such as a shiny steel, from the material to be peeled, which material is free of a possible scale layer and is characterized, in comparison with the unpeeled material to be peeled, by low surface shape tolerances and excellent surface quality.

In this regard, the "peeling head" is preferably a part of the peeling machine that performs a rotational movement during operation of the peeling machine, carries one or more peeling tools and/or reduces the diameter of the material to be peeled.

Accordingly, a "peeling tool" is then preferably a cutting tool that has a blade. During peeling or, in general, during cutting, the blade of the peeling tool penetrates into the material to be peeled and cuts chips off.

Accordingly, an "inlet guide" of a peeling machine is understood to mean, in the present case, a part of a peeling machine, in particular, that guides the material to be peeled in the direction of the peeling head. An inlet guide generally has at least one adjustment variable with which the orientation of the material to be peeled relative to the peeling head can be influenced by the inlet guide.

Preferably, the corresponding "theoretical center of the material to be peeled" is understood to mean that point, in each instance, which forms the center point of the largest possible inner circle of an infinitesimally thin cross-section of the material to be peeled.

Then the term "deviations of the material to be peeled from its reference guide position" preferably refers to the distance of the theoretical center of the material to be peeled from the center point of the circumferential path of a blade of a peeling tool on the peeling head.

"Regulation" is understood to be a method in which a fundamentally changeable variable is generally kept constant or approximately constant automatically. A property of regulation is that the value of a variable to be kept constant is established as an actual value and that the value of an adjustment variable is changed, in the event of a deviation from the desired reference value, in such a manner that the value of the variable to be kept constant approaches the reference value once again. A suitable adjustment variable can be, in particular, an adjustment variable of the inlet guide. In particular, the longitudinal expanse of a guide roller setting element should be thought of as an adjustment variable of the inlet guide.

Regulation can be undertaken by a person in that he/she determines a deviation between the actual value and the reference value and adjusts a value of an adjustment variable on an adjustment element.

Alternatively and preferably, regulation can be undertaken fully electronically, in that an actual value is determined by means of a measuring device, this value is compared with the reference value by means of a data processing and evaluation unit or electronically or electrically, and a possible deviation is converted to a value of an adjustment variable, wherein the value for the adjustment variable is passed on to an adjustment element, and wherein the adjustment element is set up for adjusting the adjustment variable using an electronic value entry. In the latter case mentioned, the adjustment element must have an adjustment drive or some other controllable adjusting device.

Until now, the state of the art provided that a technician monitored a peeling machine and adjusted the inlet guide when necessary, in such a manner that a subjectively perceived improved peeling result occurred. In particular, such interventions by the technician were necessary if the shiny material to be produced had defects in terms of surface composition. In particular, it should be considered that the shiny material to be made available still had scale on its surface.

Furthermore, the state of the art provided that the technician undertook an adjustment of the inlet guide if the volume to be cut was non-uniformly distributed on the circumference of the material to be peeled.

In other words, in the state of the art the technician can orient himself/herself only on the basis of qualitative data regarding the position of the material to be peeled when adjusting the peeling machine.

In the state of the art, in particular, the technician therefore specifically does not have a possibility of quantitatively determining a deviation between the theoretical center of the material to be peeled with reference to the peeling head, or a deviation of the material to be peeled from its reference guide position during ongoing operation of the peeling machine.

Materials to be peeled, having a connection line of the theoretical center points that forms a crooked line, require increased effort for regulation of the guide position of the material to be peeled for adjusting the inlet guide of the peeling machine.

In deviation from this, in the present case, a method for adjusting the inlet guide of a peeling machine is proposed, in which method the operator of the peeling machine additionally has quantitative information made available to him/her, particularly visually, regarding the deviation between the theoretical center of the material to be peeled with reference to the peeling head, in other words with reference to the center point of the circumferential path of a blade of a peeling tool on the peeling head or regarding a deviation of the material to be peeled from its reference guide position, and regulation performed by him/her is therefore supported by this information during ongoing operation of the peeling machine.

It is advantageous that the result can be achieved, by means of the aspects presented here, that the regulation quality can be greatly improved, in unexpected manner, during adjustment of the inlet guide.

In particular, the result can be achieved that defects of the shiny material to be produced can be prevented almost entirely. Defects should be thought of, in particular, as unevenness of the surface, for example on a surface segment that was not touched by the cutting machining process.

As the result of better regulation quality, the result can advantageously be achieved that the material supplement added to the material to be peeled during the forming process can be reduced as compared with the dimension to be achieved subsequently for the shiny material, in operationally reliable manner. As a consequence, the volume to be cut by the peeling machine can be reduced, and the peeling process can be accelerated and the material losses can be minimized, and thereby the process chain for production of a shiny steel will become more efficient and economical, as a whole.

Furthermore, it is advantageously conceivable that the required training level of the machine operator who is supposed to perform the method proposed here on a corresponding peeling machine can be lowered, and thereby possible personnel bottlenecks can be more easily circumvented or personnel costs can be reduced.

Preferably, a force that occurs between the inlet guide and the material to be peeled or forces that occur between the inlet guide and the material to be peeled are measured for regulation.

In concrete terms, it should particularly be considered here that the force to be determined or the forces to be determined are determined using a force sensor that stands at least indirectly in an active connection with a guide roller of the peeling machine, in particular its inlet guide.

Furthermore, it should be considered, in concrete terms, that a relationship should exist between a measured force or multiple measured forces and a deviation between the theoretical center of the material to be peeled with reference to the peeling head, in other words with reference to the center point of the circumferential path of a blade of a peeling tool on the peeling head, or by way of a deviation of the material to be peeled from its reference guide position, which deviation can be utilized to draw a conclusion regarding a corresponding deviation from a measured force or from measured forces, or to then keep this deviation as constant as possible accordingly, by means of regulation.

It is advantageous that a simple measurement structure can be achieved by means of the aspect presented here, by means of which structure quantitative information regarding such a deviation can be achieved.

In particular, force sensors are particularly robust, so that great availability of a measuring device can also be achieved in advantageous manner.

According to a third aspect of the invention, the highest possible quality of the peeled material to be peeled can be made possible by means of a computer-assisted method for adjusting an inlet guide of a peeling machine, in spite of possible imprecisions of the material to be peeled that is fed in, in which method a material to be peeled is guided with reference to a peeling head that carries peeling tools, by means of the inlet guide, and the peeling machine has a data processing and evaluation unit that is set up for carrying out a method according to the first two aspects, with computer support.

In the present case, a "data processing and evaluation unit" is understood to be an electronic component or an electronic device that is set up for processing and evaluating data. In particular, a data processing and evaluation unit can have a processor that is set up for data processing. A data processing and evaluation device generally pursues the goal of organized handling of data, wherein information about data obtained can be obtained, and data can be changed. In particular, a data processing and evaluation unit can be set up for carrying out an automated regulation algorithm and passing the calculated adjustment values on to the corresponding adjustment elements, so that the peeling machine can be regulated autonomously by means of the data processing and evaluation unit.

In concrete terms, accordingly, a computer-assisted program, in particular, for adjusting an inlet guide of a peeling machine is proposed. In a direct comparison with the first two aspects and the third aspect, the peeling machine then preferably needs a data processing and evaluation unit in order to carry out the computer-assisted method, accordingly, which is set up for autonomously carrying out the computer-assisted adjustment method and for passing calculated adjustment values on to corresponding adjustment elements of the peeling machine.

In advantageous manner, the result can be achieved, by means of the aspect presented here, that a peeling machine provided with the computer-assisted adjustment method can be regulated autonomously or at least partially autonomously, and thereby personnel expenditures for operation of the corresponding peeling machine can be reduced.

It should be explicitly pointed out that the object of the third aspect can advantageously be combined with the first two aspects, specifically both individually or cumulatively, in any desired combination.

According to a fourth aspect, a peeling machine comprising an entry region having an inlet guide, a peeling head that carries peeling tools, and an exit region, wherein the inlet guide carries at least two guide rollers, by means of at least one roller carrier, in each instance, wherein at least one of the roller carriers can be adjusted by way of at least one guide roller setting element, can allow the highest possible quality of the peeled material to be peeled in spite of possible imprecisions of the material to be peeled that is fed in, if the peeling machine comprises a measuring device for determining a deviation of the material to be peeled from its reference guide position.

In the present connection, the "entry region" of a peeling machine is preferably that region of a peeling machine in which the material to be peeled is brought into contact with the peeling machine.

In the present connection, the "exit region" of a peeling machine is then preferably that region in which the shiny steel runs out of the peeling machine.

In the present connection, a "guide roller" is understood to be, in particular, a mechanical roller that is set up for guiding the material to be peeled. In particular, the material to be peeled can roll over the guide roller and be influenced with regard to its running direction.

In particular, that part or component of a peeling machine that serves as a support for a guide roller and consequently connects the guide roller with the peeling machine is referred to as a "roller carrier."

In the present connection, a "guide roller setting element" is understood to be, in particular, any actuator that is set up for varying the distance between the guide roller and the center point of the circumferential path of a blade of a peeling tool on the peeling head, in that preferably, the longitudinal expanse of the guide roller setting element can be adjusted. The longitudinal expanse of the guide roller setting element is then an adjustment variable of the inlet guide of a peeling machine. By means of variation of this adjustment variable, the theoretical center of the material to be peeled, with reference to the center point of the circumferential path of a blade of a peeling tool on the peeling head, can be varied.

In particular in the case of an adjustment variable of the inlet guide, one should think, accordingly, of the longitudinal expanse of a guide roller setting element.

In the present connection, a "measuring device" preferably refers to an apparatus for measuring a physical variable. In particular, one should think, in the case of a measuring device, of an apparatus by means of which the deviation of the material to be peeled from its reference guide position can be determined, at least indirectly. Directly, the measuring device can be set up for determining the longitudinal expanse of the guide roller setting element. As a particular feature, the measuring device can also be set up here for passing the reference value for the longitudinal expanse of the guide roller setting element on to the guide roller setting element. Likewise, it is conceivable that the measuring device measures a force or forces that can be viewed as a corresponding dimension, for example for the deviation of the material to be peeled from its reference guide position or the like. Furthermore, the measuring device can be set up for output of the deviation of the material to be peeled from its reference guide position to a visualization, so that the deviation of the material to be peeled from its reference guide position can be displayed by the visualization.

Until now, the state of the art provided that a technician undertook regulation of a peeling machine on the basis of the deviations directly visible to him/her. These included defects on the surface composition of the shiny steel to be produced and a volume of material to be cut that was irregularly distributed on the circumference of the material to be peeled. In other words, only qualitative information regarding the position of the material to be peeled was available to the technician for regulating the peeling machine.

In deviation, it is proposed here to make quantitative information regarding the deviation of the material to be peeled from its reference guide position available to the operator.

In advantageous manner, it can be achieved, by means of the aspect presented here, that the operator of the peeling machine is given more precise information about the deviation of the material to be peeled from its reference guide position, so that manual regulation intervention that is undertaken can also be carried out with greater precision.

Preferably, the measuring device is connected with the guide roller setting element so as to interact with it. In this connection, an "interactive connection" is particularly understood to mean that the guide roller setting element and the measuring device are connected by means of a data line or by way of some other signal connection, wherein the measuring device is set up for passing the reference value for the longitudinal expanse of the guide roller setting element on to the guide roller setting element and/or for reading the actual value for the longitudinal expanse of the guide roller setting element out from the guide roller setting element. In advantageous manner, in this way the result can be achieved that the peeling machine is controlled directly by the measuring device or that establishing a corresponding regulation circuit can be made possible.

In a particularly advantageous embodiment, the measuring device is arranged on the roller carrier that can be adjusted by way of the guide roller setting element and/or on the guide roller carried by it. In advantageous manner, this allows a direct measurement at a local point of attack of the inlet guide on the corresponding material to be peeled. In particular, in combination with an interactive connection between the measuring device and the guide roller setting element, the result can advantageously be achieved that precise control of an individual guide roller is made possible. Corresponding regulation can thereby be coordinated more precisely.

Optionally, the measuring device comprises a force sensor. Accordingly, a "force sensor" is understood to be any sensor that is set up for determining the physical size of a force. A force sensor allows simple and precise measurement of a physical variable that can be viewed as being proportional to the deviation of the material to be peeled from the reference guide position, in particular if the inlet guide comprises a spring mechanism, since forces can be measured in simple and precise manner there.

Preferably, the inlet guide carries three, four, five or seven guide rollers, which are each carried by the inlet guide by means of a roller carrier, wherein each of the roller carriers can be adjusted by way of at least one guide roller setting element. This allows correspondingly more precise guidance. If necessary, the roller carriers can also carry more than one guide roller, in other words, for example, two, three or four guide rollers, wherein in these cases, as well, three, four, five or seven roller carriers, in particular, can be provided. Instead of the guide rollers, guide rulers can also be provided, which can then be carried by corresponding carriers, in other words preferably by three, four, five or seven carriers.

Preferably, each of the guide roller setting elements is connected with a measuring device, in each instance, so that correspondingly, precise and good all-around measurement and also individual regulation of the guide rollers is possible.

If each measuring device is arranged on the roller carrier that belongs to the corresponding guide roller setting element and/or on the guide roller carried by it, precise measurement of each of the guide rollers can be guaranteed.

Preferably, the peeling machine is set up for carrying out a method according to the first, the second and/or the third aspect.

The advantages of a method or of a computer-assisted method for adjusting an inlet guide of a peeling machine, in which method a material to be peeled is guided with reference to a peeling head that carries peeling tools, by means of the inlet guide, can be extended, as described above, directly to a peeling machine comprising an entry region having an inlet guide, a peeling head that carries peeling tools, and an exit region, wherein the inlet guide carries at least two guide rollers by means of at least one roller carrier, in each instance, wherein at least one of the roller carriers can be adjusted by way of at least one guide roller setting element, wherein the peeling machine comprises a measuring device for determining a deviation of the material to be peeled from its reference guide position.

It is understood that the characteristics of the solutions described above and in the claims can also be combined, if necessary, so as to be able to implement the advantages cumulatively, accordingly. In particular, it should be explicitly pointed out that the objects of all four aspects can advantageously be combined with one another, specifically individually or in any desired combination.

Figure 2:
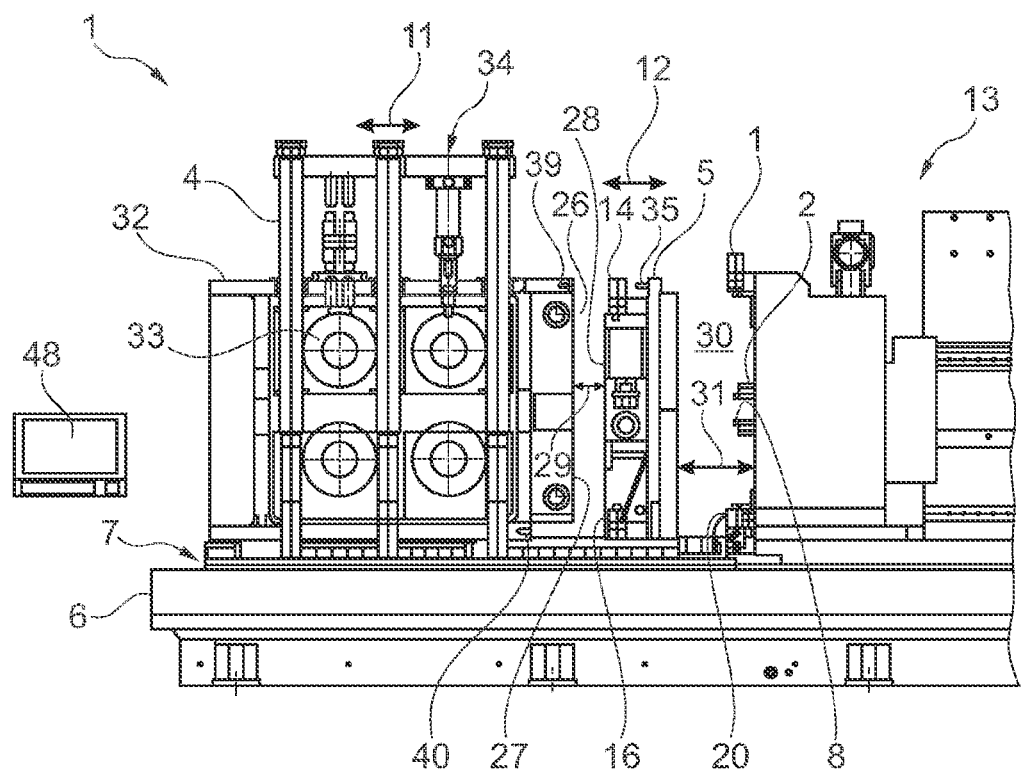
Figure 3:
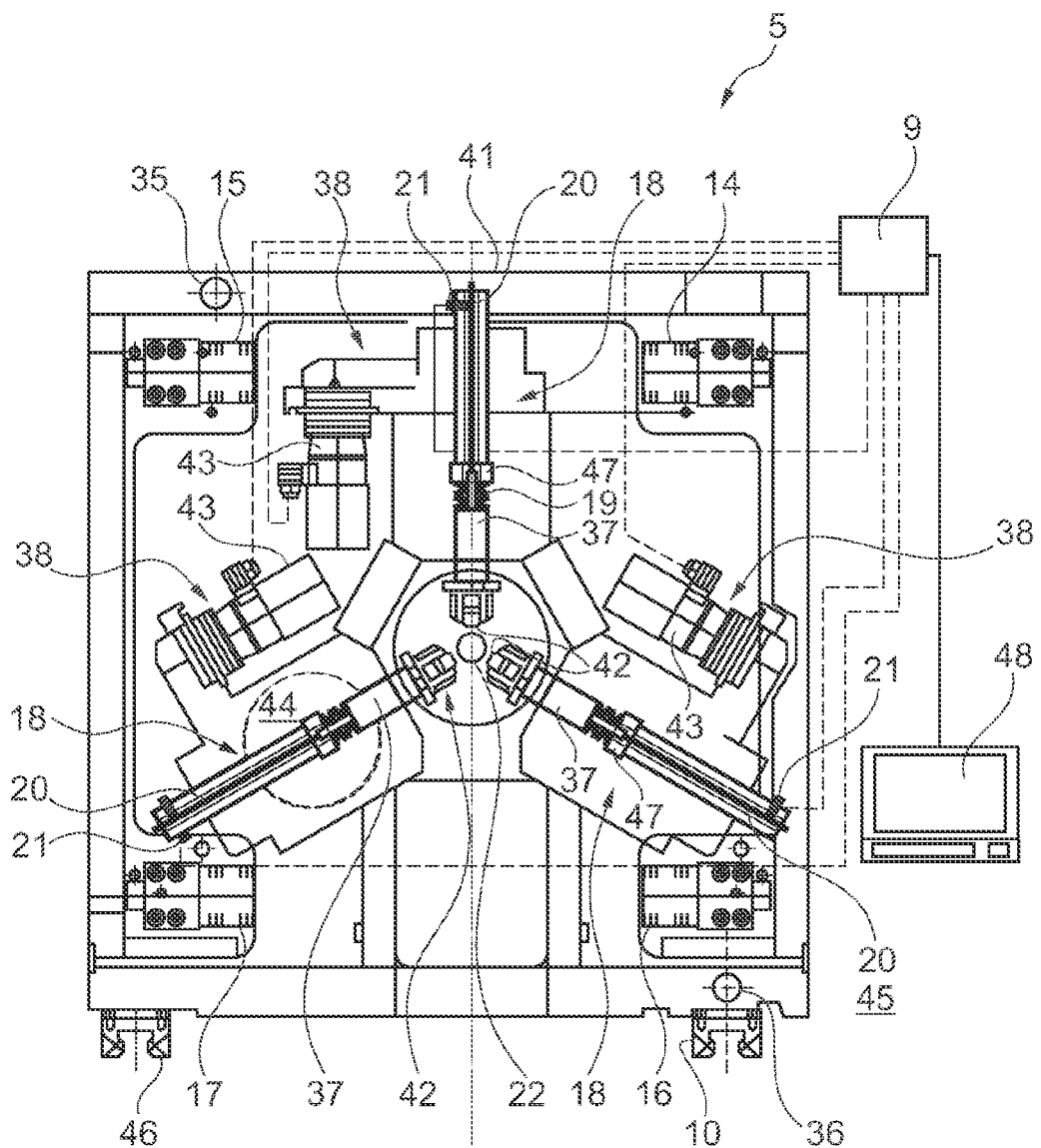
Figure 4:
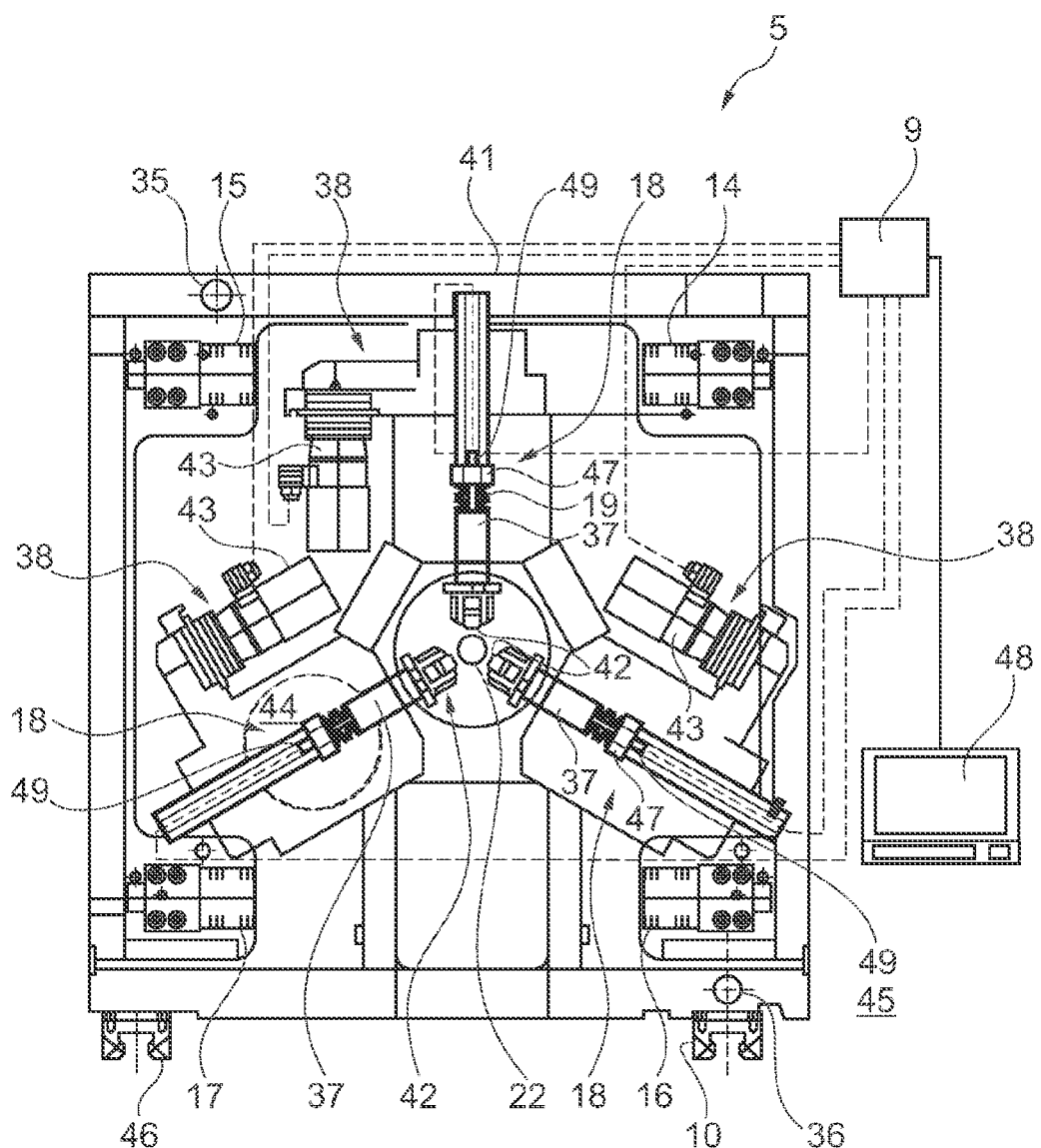

Further advantages, goals, and properties of the present invention will be explained using the following description of exemplary embodiments, which are particularly also shown in the attached drawing. In the drawing, the figures show:

FIG. 1 schematically, a peeling machine in the region of a peeling head, and an advancing device having an advancing apparatus and an inlet guide;

FIG. 2 the peeling machine from the preceding FIG. 1, in which the advancing apparatus is separated from the inlet guide, and the inlet guide is separated from the peeling machine gear mechanism;

FIG. 3 schematically, a view of the inlet guide with wedge clamping elements in the transport direction of a material to be peeled; and FIG. 4 schematically, a view of an alternative inlet guide with wedge clamping elements in the transport direction of a material to be peeled.

The peeling machine 1 shown in FIGS. 1 and 2 has an advancing device 3 in the region of its peeling head 2 with its peeling tools 8.

Ultimately, in order to then be able to perform a peeling process, the peeling head 2 and therefore also the peeling tools 8 can rotate.

The advancing device 3 shown in FIGS. 1 and 2 in turn has an advancing apparatus 4 and an inlet guide 5.

The advancing apparatus 4 and the inlet guide 5 are arranged so as to be displaceable on a traverse 6 of the peeling machine 1, wherein the traverse 6 forms a linear guide 7 for the advancing apparatus 4 and the inlet guide 5. Both the advancing apparatus 4 and the inlet guide 5 can be moved along the linear guide 7 in both directions of the arrows 11 and 12. Therefore, for one thing, the advancing apparatus 4 and the inlet guide 5 can be individually moved away from a peeling machine gear mechanism 13 of the peeling machine 1, or moved toward the peeling machine gear mechanism 13 of the peeling machine 1. For another thing, the advancing apparatus 4 and the inlet guide 5 can be moved relative to one another. This means that the advancing apparatus 4 can also be moved on the traverse 6 independently of the inlet guide 5 and vice versa. It is understood that in deviating embodiments, a different arrangement of advancing apparatus 4 and inlet guide 5 can also be selected here.

In the operating state of the peeling machine 1 illustrated in FIG. 1, the advancing apparatus 4 and the inlet guide 5 are connected with one another to form a compact advancing device 3, and the advancing device 3 is furthermore connected, together with the inlet guide 5, to the peeling machine gear mechanism 13 of the peeling machine 1. In order for both the advancing apparatus 4 and the inlet guide 5, in particular in the operating state shown, to be reliably connected with the peeling machine gear mechanism 13, for one thing the advancing apparatus 4 and the inlet guide 5 are firmly but releasably wedged into one another by means of first upper wedge clamping elements 14 and 15, as well as by means of lower wedge clamping elements 16 and 17 (see also FIG. 3). For another thing, the inlet guide 5 and the peeling machine gear mechanism 13 are firmly but releasably wedged into one another by means of second upper wedge clamping elements (not explicitly shown here) as well as by means of second lower wedge clamping elements (also not explicitly shown here).

In this wedged state, a material 22 to be peeled can be precisely guided to the peeling head 2 of the peeling machine 1 and thereby to the rotating peeling tools by means of the advancing apparatus 4, by way of the inlet guide 5. For this purpose, the material 22 to be peeled is guided in the transport direction 24, from an entry region 23, through the peeling machine 1, continuously to an exit region 25, by means of the advancing device 3.

In the arrangement according to FIG. 2, the advancing apparatus 4 has been displaced to be at a distance from the inlet guide 5, in such a manner that an installation space 26 occurs between the advancing apparatus 4 and the inlet guide 5, which space allows good accessibility not only at the end 27 of the advancing apparatus 4 on the inlet side end, but also at the end 28 of the inlet guide 5 on the advancing apparatus side end. In order to implement the installation space 26, the advancing apparatus 4 is spaced apart from the inlet guide 5 at the distance 29.

Furthermore, in the case of the arrangement according to FIG. 2, the advancing apparatus 4 and the inlet guide 5 have been displaced away from the peeling machine gear mechanism 13 of the peeling machine 1 to such an extent that a further installation space 30 is made available between the inlet guide 5 and the peeling machine gear mechanism 13. Accordingly, the inlet guide 5 is spaced apart from the peeling machine gear mechanism 13 at a distance 31.

It is understood that the inlet guide 5 and the advancing apparatus 4 do not necessarily have to be configured to be releasable and displaceable relative to one another in every exemplary embodiment. In particular, these can also be arranged at a fixed distance from one another or in some other way, as long as advancing, on the one hand, and guidance, on the other hand, can be ensured.

In the present exemplary embodiments, the advancing apparatus 4 has a frame 32 that resists twisting, in which not only the inlet rollers 33 (numbered only as examples here) but also a drive and adjustment mechanism 34 of the inlet rollers 33 are arranged.

Furthermore, in these exemplary embodiments the inlet guide 5 has a first locking bolt 35 and a second locking bolt 36 (see FIGS. 3 and 4 in this regard).

In this exemplary embodiment, the peeling machine gear mechanism 13 also has a first and a second locking bolt (not explicitly shown here).

The first locking bolt 35 of the inlet guide 5 interacts with a complementary locking sleeve 39 in the operating state (see FIG. 1) of the peeling machine 1, and the second locking bolt 36 accordingly interacts with a complementary locking sleeve 40 in the operating state. The locking bolts 35 and 36 ensure that the frame 32 of the advancing apparatus 4 and a twist-resistant box 41 (see FIGS. 3 and 4) of the inlet guide 5 are moved toward one another in guided manner. Furthermore, the twist-resistant frame 32 and the twist-resistant box 41 are additionally mounted in non-rotatable manner relative to one another by means of the locking bolts 35 and 36, in addition to the linear guide 7. By means of the locking bolts 35 and 36, the entire advancing device 3 is held together in significantly more robust and twist-resistant manner. It is understood that in deviating exemplary embodiments, resistance to twisting can also be ensured or guaranteed in sufficient measure in other ways.

The same also holds true with regard to the locking bolts of the peeling machine gear mechanism 13. These interact with corresponding locking sleeves (not explicitly shown here), which are provided on the inlet guide 5. In the present case, the active connection between the advancing apparatus 4 and the inlet guide 5 will be described in greater detail only as an example. Depending on the concrete embodiment, sufficient guidance and fixation of the modules described above, with one another, can already be achieved merely with two locking bolts and corresponding complementary locking sleeves. It is understood that in the case of further exemplary embodiments, however, more than two locking bolts and locking sleeves can also be used.

In this exemplary embodiment, the inlet guide 5 additionally also has locking bolts 35 and 36, which pre-fix the advancing apparatus 4 and the inlet guide 5 to one another, independently of the wedge clamping elements 14, 15, 16, and 17.

A first running shoe 10 and a second running shoe 46 are arranged in the lower region 45 of the twist-resistant box 41 of the inlet guide 5. The inlet guide 5 is connected with the linear guide 7 of the peeling machine 1 in translationally displaceable manner, by way of the two running shoes 10 and 46.

In this exemplary embodiment, three guide rollers 42 arranged in star shape relative to one another are provided in the twist-resistant box 41 of the inlet guide 5. Each of these guide rollers 42 is carried, in advantageous manner, by a roller carrier 37, which in turn can be individually controlled by means of a guide roller setting element 38, which comprises an actuator motor 43 and a corresponding actuator motor gear mechanism 44 in this exemplary embodiment, so that the material 22 to be peeled, which is supposed to be peeled, can be fed to the peeling head 2 (see FIG. 1) or to the peeling tools 8 with extremely great precision.

In this regard, the connection between the guide roller setting element 38 or, in this exemplary embodiment, the actuator motor 44, and the corresponding guide roller 42 is sprung by way of a plate spring package 19, so that out-of-roundness or other local deviations in the material 22 to be peeled can be balanced out.

The plate spring package 19 lies against the roller carrier 37, on the one hand, and against a leveling foot 47, on the other hand, which in turn can be adjusted in the direction toward the material 22 to be peeled or away from it, by means of the corresponding actuator motor gear mechanism 44.

In the exemplary embodiment shown in FIG. 3, the relative position between the corresponding roller carrier 37, on the one hand, and the leveling foot 47, on the other hand, can be measured by means of a measurement dowel 20 by way of a position measuring device 21, and because of the spring constants of the plate spring package 19, this represents a direct measurement of the force that is in effect between the roller carrier 37 or the guide roller 42 and the leveling foot 47 or the actuator motor gear mechanism 44 and the inlet guide 5. Accordingly, by means of this arrangement, a force sensor 18 is made available, which can measure a force that occurs between the inlet guide 5 and the material 22 to be peeled, or which, together with the other force sensors 18, can measure the forces that occur between the inlet guide 5 and the material 22 to be peeled.

The structure of the exemplary embodiment according to FIG. 4, in which the force sensor 18 is implemented by means of a force transducer 49, which is arranged in the leveling foot 47 and can directly measure the forces acting on the leveling foot 47 and then output them, deviates slightly from this.

The force sensors 18 are therefore a component of a measuring device 9 for determining a deviation of the material to be peeled from its required guidance position, since such deviations directly result in a change of the force or forces.

The measurement results of the measuring device 9 are then used to control the actuator motors 43 accordingly. Depending on the concrete implementation, the measurement results of a corresponding force sensor 18 can be used directly to control the actuator motor 43 that acts on the roller carrier 37 with which the corresponding force sensor 18 is directly connected in active manner. In other implementations, it is also possible to use the measurement results of all the force sensors 18 so as to determine the signals for controlling the actuator motors 43 from their combination with one another, wherein the two possibilities can also be combined or, if applicable, further measurement results can be used supplementally.

In the present exemplary embodiment, the measured forces are displayed in a visualization 48.

The dimension with which the individual guide roller setting elements 38 are controlled takes place, in the present case, in a control circuit that comprises the force sensors 18. In the present exemplary embodiment, control takes place by way of delivery of a pulse, wherein the step width of the pulse adjustment can be selected by way of the visualization in this exemplary embodiment. It is understood that in deviating embodiments, it is also possible to waive selectability of the step width or that a different type of control can be selected.

REFERENCE SYMBOL LIST 1 peeling machine
2 peeling head
3 advancing device
4 advancing apparatus
5 inlet guide
6 traverse
7 linear guide
8 peeling tool
9 measuring device
10 first running shoe
11 arrow
12 arrow
13 peeling machine gear mechanism
14 wedge clamping elements
15 wedge clamping elements
16 wedge clamping elements 17 wedge clamping elements
18 force sensor
19 plate spring package (numbered as an example)
20 measurement dowel
21 position measuring device
22 material to be peeled
23 entry region
24 transport direction
25 exit region
26 installation space
27 end on the inlet guide side
28 end on the advancing apparatus side
29 distance
30 installation space
31 distance
32 frame
33 inlet rollers
34 drive and adjustment mechanism
35 locking bolt
36 locking bolt
37 roller carrier
38 guide roller setting element
39 locking sleeve
40 locking sleeve
41 box
42 guide roller (numbered only as an example here)
43 actuator motor (numbered only as an example here)
44 actuator motor gear mechanism (numbered only as an example here)
45 lower region
46 second running shoe
47 leveling foot
48 visualization
49 force transducer

The invention claimed is:

1. A method for adjusting an inlet guide of a peeling machine, the method comprising:
providing the peeling machine comprising:
an entry region having the inlet guide,
a peeling head that carries peeling tools,
an exit region,
a first guide roller carried by the inlet guide using at least a first roller carrier, a second guide roller carried by the inlet guide using at least a second roller carrier and a third guide roller carried by the inlet guide using at least a third roller carrier,
at least one guide roller setting element for adjusting a position of at least one of the first roller carrier, the second roller carrier and the third roller carrier, the at least one guide roller setting element comprising a first guide roller setting element, a second guide roller setting element and third guide roller setting elements for adjusting the first roller carrier, the second roller carrier and the third roller carriers in position, respectively, wherein the first roller carrier can be adjusted in position by way of the first guide roller setting element, the second roller carrier can be adjusted in position by way of the second guide roller setting element and the third roller carrier can be adjusted in position by way of the third guide roller setting element, and
a measuring device comprising a force sensor for determining a deviation of a material to be peeled from a reference guide position of the material to be peeled, the measuring device being connected with the guide roller setting element so as to interact with the guide roller setting element,
guiding the material to be peeled using the inlet guide, with reference to the peeling head that carries the peeling tools;
measuring a force that occurs between the inlet guide and the material to be peeled or forces that occur between the inlet guide and the material to be peeled; and
regulating based on the force or forces the inlet guide so that, in terms of an effect of the inlet guide on the material to be peeled, a theoretical center of the material to be peeled remains as constant as possible with reference to the peeling head and/or with reference to the inlet guide, over a length of the material to be peeled.

2. The adjusting method according to claim 1, in which the peeling machine has a data processing and evaluation unit, which is set up for carrying out the method in a computer-assisted manner.

3. A peeling machine comprising:
an entry region having an inlet guide,
a peeling head that carries peeling tools, and
an exit region,
wherein the inlet guide carries a first guide roller using at least a first roller carrier, a second guide roller using at least a second roller carrier and a third guide roller using at least a third roller carrier,
wherein a position of at least one of the first roller carrier, the second roller carrier and the third roller carrier can be adjusted by way of at least one guide roller setting element,
wherein the at least one guide roller setting element comprises a first guide roller setting element, a second guide roller setting element and third guide roller setting elements for adjusting the first roller carrier, the second roller carrier and the third roller carriers in position, respectively,
wherein the first roller carrier can be adjusted in position by way of the first guide roller setting element, the second roller carrier can be adjusted in position by way of the second guide roller setting element and the third roller carrier can be adjusted in position by way of the third guide roller setting element,
wherein the peeling machine further comprises a measuring device for determining a deviation of a material to be peeled from a reference guide position of the material to be peeled,
wherein the measuring device is connected with the guide roller setting element so as to interact with the guide roller setting element, and
wherein the measuring device comprises a force sensor.

4. The peeling machine according to claim 3, wherein the measuring device is disposed on at least one of the first roller carrier and the second roller carrier that can be adjusted in position by way of the guide roller setting element, and/or on at least one of the first guide roller carried by the first roller carrier and the second guide roller carried by the second roller carrier.

* * * * *